United States Patent
Park et al.

(10) Patent No.: US 9,519,366 B2
(45) Date of Patent: Dec. 13, 2016

(54) TOUCH SENSOR

(71) Applicant: SAMSUNG ELECTRO-MECHANICS CO., LTD., Suwon-Si (KR)

(72) Inventors: Jang Ho Park, Suwon-Si (KR); Woon Chun Kim, Suwon-Si (KR); Jin Uk Lee, Suwon-Si (KR); Nam Keun Oh, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 243 days.

(21) Appl. No.: 14/273,459

(22) Filed: May 8, 2014

(65) Prior Publication Data

US 2014/0333855 A1 Nov. 13, 2014

(30) Foreign Application Priority Data

May 10, 2013 (KR) .................. 10-2013-0053359
Dec. 24, 2013 (KR) .................. 10-2013-0162829

(51) Int. Cl.
*G06F 3/041* (2006.01)
*G06F 3/044* (2006.01)
*G06F 3/045* (2006.01)

(52) U.S. Cl.
CPC ............ *G06F 3/041* (2013.01); *G06F 3/044* (2013.01); *G06F 3/045* (2013.01); *G06F 2203/04103* (2013.01); *G06F 2203/04112* (2013.01)

(58) Field of Classification Search
CPC .......... G06F 3/041; G06F 3/044; G06F 3/045; G06F 2203/04103
USPC ............ 345/156–178; 349/12, 200, 41, 100; 178/18.05; 174/257, 258, 253; 324/661, 324/668, 686; 327/517; 200/600; 313/511; 315/169.3; 73/862.68
See application file for complete search history.

(56) References Cited

U.S. PATENT DOCUMENTS

| | | | | |
|---|---|---|---|---|
| 6,010,751 A | * | 1/2000 | Shaw | G02B 5/287 427/255.6 |
| 6,483,498 B1 | * | 11/2002 | Colgan | G06F 3/045 178/18.05 |
| 2005/0172722 A1 | * | 8/2005 | Kobayashi | G01L 1/14 73/754 |
| 2007/0102192 A1 | | 5/2007 | Naito et al. | |
| 2008/0265788 A1 | * | 10/2008 | Yamauchi | H03K 17/962 315/169.3 |

(Continued)

FOREIGN PATENT DOCUMENTS

EP   2 482 172 A1   8/2012
JP   2005-344207 A   12/2005
(Continued)

OTHER PUBLICATIONS

Japanese Office Action issued on Aug. 4, 2015 in counterpart Japanese Application No. 2014-097067 (15 pages, with English translation).

(Continued)

*Primary Examiner* — Prabodh M Dharia
(74) *Attorney, Agent, or Firm* — NSIP Law (57) ABSTRACT

A touch sensor includes a transparent substrate, and an electrode pattern formed on the transparent substrate. The electrode pattern is formed by stacking at least two or more electrode layers, thereby enhancing the anti-corrosion and visibility of electrode patterns and ensuring the adhesive reliability of the transparent substrate and the electrode patterns.

16 Claims, 5 Drawing Sheets

(56) References Cited

U.S. PATENT DOCUMENTS

| | | | |
|---|---|---|---|
| 2009/0046077 A1* | 2/2009 | Tanaka | G06F 3/044 345/174 |
| 2009/0096760 A1* | 4/2009 | Ma | G02F 1/13338 345/174 |
| 2010/0066964 A1* | 3/2010 | Takatori | G02F 1/133707 349/139 |
| 2010/0265193 A1* | 10/2010 | Kung | G06F 3/044 345/173 |
| 2011/0134055 A1* | 6/2011 | Jung | G06F 3/044 345/173 |
| 2011/0139516 A1* | 6/2011 | Nirmal | G06F 3/044 178/18.01 |
| 2012/0188184 A1* | 7/2012 | Lin | G06F 3/041 345/173 |
| 2012/0206395 A1 | 8/2012 | Misaki | |
| 2012/0261242 A1* | 10/2012 | Guard | G06F 3/044 200/600 |
| 2012/0313873 A1* | 12/2012 | Bright | G06F 3/044 345/173 |
| 2012/0313877 A1* | 12/2012 | Han | G06F 3/041 345/173 |
| 2012/0315383 A1* | 12/2012 | Bright | G06F 3/044 427/108 |
| 2013/0092926 A1* | 4/2013 | Yamazaki | H01L 21/76897 257/43 |
| 2013/0200370 A1* | 8/2013 | Yamazaki | H01L 27/1225 257/43 |
| 2013/0222314 A1* | 8/2013 | Wang | G06F 3/041 345/173 |
| 2013/0222756 A1* | 8/2013 | Van Heugten | G02B 5/1876 349/200 |
| 2013/0242217 A1* | 9/2013 | Naoe | G02F 1/13439 349/41 |
| 2013/0242485 A1 | 9/2013 | Ohtani et al. | |
| 2013/0256008 A1* | 10/2013 | Zeng | H01H 11/00 174/257 |
| 2013/0293096 A1* | 11/2013 | Kang | H01H 1/10 313/511 |
| 2013/0342221 A1* | 12/2013 | Virkar | G06F 3/041 324/661 |
| 2014/0002176 A1* | 1/2014 | Guard | H03K 17/962 327/517 |
| 2014/0002358 A1* | 1/2014 | Bruwer | G05G 9/047 345/158 |
| 2014/0071353 A1* | 3/2014 | Nashiki | G02F 1/13338 349/12 |
| 2014/0111708 A1* | 4/2014 | Cheng | G01R 27/2605 349/12 |
| 2014/0132569 A1* | 5/2014 | Lien | G06F 3/041 345/175 |
| 2014/0132861 A1* | 5/2014 | Wang | G06F 3/044 349/12 |
| 2014/0174200 A1* | 6/2014 | Park | G06F 3/044 73/862.68 |
| 2014/0176819 A1* | 6/2014 | Yilmaz | G06F 1/1692 349/12 |
| 2014/0204285 A1* | 7/2014 | Jang | G06F 3/044 349/12 |
| 2014/0363933 A1* | 12/2014 | Sun | H01B 1/026 438/151 |
| 2015/0021584 A1* | 1/2015 | Guard | G06F 3/0412 257/40 |
| 2015/0097587 A1* | 4/2015 | Weaver | G06F 3/0418 324/686 |
| 2015/0101853 A1* | 4/2015 | Lee | H05K 1/0274 174/258 |
| 2015/0144380 A1* | 5/2015 | Yang | H05K 1/097 174/253 |
| 2015/0231874 A1* | 8/2015 | Jin | B41F 5/24 101/483 |

FOREIGN PATENT DOCUMENTS

| | | |
|---|---|---|
| JP | 2011-065393 | 3/2011 |
| JP | 2011-175967 | 9/2011 |
| JP | 2012-103761 A | 5/2012 |
| JP | 2012-195443 A | 10/2012 |
| JP | 2012-204763 A | 10/2012 |
| JP | 2013-84026 A | 5/2013 |
| KR | 2009-0003261 | 1/2009 |
| KR | 2012-0035874 | 4/2012 |
| KR | 2012-0116281 | 10/2012 |
| WO | WO 2005/060326 A1 | 6/2005 |
| WO | WO 2006/001594 A1 | 1/2006 |
| WO | WO 2012/121518 A2 | 9/2012 |

OTHER PUBLICATIONS

Office action dated Apr. 3, 2015 from corresponding Korean Patent Application No. 10-2013-0162829 and its English translation by the applicant's foreign counsel.

* cited by examiner

TOUCH SENSOR

CROSS REFERENCE TO RELATED APPLICATION

This application claims the benefit of Korean Patent Application No. 10-2013-0053359, filed on May 10, 2013, entitled "Touch Sensor" and Korean Patent Application No. 10-2013-0162829, filed on Dec. 24, 2013, entitled "Touch Sensor", which are hereby incorporated by reference in its entirety into this application.

BACKGROUND

1. Technical Field

The present technology generally relates to a touch sensor.

2. Description of the Related Art

As computers using digital technologies have been developed, auxiliary equipment of computers has correspondingly been developed together. A personal computer, a portable transmitting apparatus, or other personal exclusive information processing apparatuses perform text and graphic processes by using various input devices such as keyboards, mouse, and the like.

However, along with the rapid development of an information-oriented society, computers have been widely used, and thus, it is difficult to effectively drive a product by using only a keyboard and a mouse, which presently function as an input device. Accordingly, there is an increasing need for a device to which anyone can easily input information via a simple method without causing an erroneous operation.

Technologies for input devices have exceeded the standard for providing general functions and interest in input devices has changed toward high reliability, high durability, high innovation, design and process-related technologies. To this end, a touch panel has been developed as an input device for inputting information such as text, graphic, and so on.

A touch sensor is a device that is installed on a display surface of a flat display apparatus such as an electronic notebook, a liquid crystal display device (LCD), a plasma display panel (PDP), or electroluminescence (EL) or a display surface of an image displaying apparatus such as a cathode ray tube (CRT) and is used for a user to select desired information while watching the image displaying apparatus.

A touch sensor is classified into a resistive type touch sensor, a capacitive type touch sensor, an electro-magnetic type touch sensor, a surface acoustic wave (SAW) type touch sensor, and an infrared type touch sensor. Such various types of touch sensors are used in electronic products in consideration of issues of signal amplification, a resolution difference, difficulty in design and process technologies, optical properties, electrical properties, mechanical properties, environmental properties, input properties, durability, and economic feasibility. Currently, from among various types of touch sensors, a resistive type touch sensor and a capacitive type touch sensor have been most commonly used.

As disclosed in Japanese Patent Application Publication No. 2011-175967, electrode patterns of a touch sensor formed of metal have been used. When electrode patterns are formed of metal, excellent electric conductivity and smooth supply and demand may be achieved. However, when electrode patterns are formed of metal, the electrode patterns may be visible to a user. Various problems may arise in that it is difficult to embody fine patterns due to difference in etching rates at lower portions of electrode patterns during a patterning process for forming the electrode patterns, the electrode pattern is visible due to the opacity of a metal electrode used for electric conductivity, and the reliability of a touch sensor is degraded due to the anti-corrosion of exposed electrode patterns.

SUMMARY

Some embodiments of the present invention may provide a touch sensor for enhancing the anti-corrosion of exposed portions of electrode patterns and the adhesive reliability between electrode patterns and a transparent substrate using the electrode patterns as at least two stack structures.

Some embodiments of the present invention may provide a touch sensor for overcoming problems in terms of visibility of electrode patterns due to conductive metals by forming an exposed portion of the electrode patterns, which is visible to a user, with heterogeneous materials.

Some embodiments of the present invention may provide a touch sensor for ensuring the electrical conductivity of electrode patterns and overcoming problems in terms of the visibility and anti-corrosion of electrode patterns by forming a electrode layer having multi-layered structure for forming electrode patterns of the touch sensor as an alloy layer and controlling an appropriate amount ratio of related materials according to anti-corrosion or visibility.

According to an embodiment of the present invention, a touch sensor may include a transparent substrate, and an electrode pattern formed on the transparent substrate. The electrode pattern may be formed by stacking two or more electrode layers.

The electrode pattern may be formed by sequentially stacking, from one surface of the transparent substrate, a base layer as a first electrode layer and a conductive layer as a second electrode layer.

The electrode pattern may be formed by further stacking a surface layer as a third electrode layer on the second electrode layer.

The touch sensor may further include an electrode wiring connected to the electrode pattern for electrical connection of the electrode pattern. The electrode wiring may comprise a plurality of electrode wiring layers corresponding to the respective electrode layers of the electrode pattern.

The electrode pattern may be formed with a mesh pattern.

The touch sensor may further include a mesh type contact pad formed at one end of the electrode wiring for electrical connection of the electrode wiring.

The second electrode layer may have higher conductivity than the first electrode layer.

The first electrode layer may have lower reflectivity than the second electrode layer.

The first electrode layer may include at least one selected from the group consisting of CuNi, NiCr, titanium (Ti), and molybdenum (Mo), or an alloy thereof.

The second electrode layer may include at least one selected from the group consisting of copper (Cu), aluminium (Al), and silver (Ag) or an alloy thereof.

The third electrode layer may include at least one selected from the group consisting of CuNi, NiCr, Ti, and Mo or an alloy thereof.

The first electrode layer and the third electrode layer may include at least one selected from the group consisting of manganese (Mn), iron (Fe), or silicon (Si).

The amount of Mn, Fe, or Si included in the first electrode layer and/or the third electrode layer may be 0.1 wt % to 3 wt %.

The first electrode layer may include 10 wt % to 80 wt % of Ni.

The first electrode layer may include 20 wt % to 70 wt % of Ni.

The third electrode layer may include 10 wt % to 80 wt % of Ni.

The third electrode layer may include 20 wt % to 70 wt % of Ni.

The second electrode layer may be formed of an alloy including Cu and Ni. The amount of Ni included in the second electrode layer may be 0.1 wt % to 5 wt %.

The first electrode layer may include 3 wt % to 50 wt % of chrome (Cr).

The first electrode layer may include 5 wt % to 70 wt % of Cr.

The third electrode layer may include 3 wt % to 50 wt % of Cr.

The third electrode layer may include 5 wt % to 70 wt % of Cr.

The transparent substrate may be formed with transmittance equal to or greater than 85%.

The transparent substrate may be formed as a resin layer.

The resin layer may be formed of at least one of polyethylene terephthalate (PET), polycarbonate (PC), polymethylmethacrylate (PMMA), polyethylenenaphthalate (PEN), polyehtersulfone (PES), cyclic olefin polymer (COP), triacetylcellulose (TAC) film, polyvinyl alcohol (PVA) film, polyimide (PI) film, polystyrene (PS), K-resin containing biaxially oriented PS (BOPS), or a combination thereof.

The transparent substrate may be formed of glass or temperate glass.

The first electrode layer may be formed to have a smaller thickness in the stack direction than that of the second electrode layer.

A stack-direction thickness d1 of the first electrode layer, a stack-direction thickness d2 of the second electrode layer, and a stack-direction thickness d3 of the third electrode layer may satisfy a following conditional expression:

$d1 < d3 < d2.$

The sum of a stack-direction thickness d1 of the first electrode layer, a stack-direction thickness d2 of the second electrode layer, and a stack-direction thickness d3 of the third electrode layer may be 0.05 μm to 2 μm.

A stack-direction thickness of the first electrode layer may be 0.01 μm to 1.935 μm.

A stack-direction thickness of the second electrode layer may be 0.04 μm to 1.975 μm.

A stack-direction thickness of the third electrode layer may be 0.015 μm to 1.95 μm.

A stack-direction thickness d1 of the first electrode layer, a stack-direction thickness d2 of the second electrode layer, and a stack-direction thickness d3 of the third electrode layer may satisfy a following conditional expression:

$2\% \le d2/(d1+d2+d3) \times 100 \le 98.75\%.$

In some embodiments, a touch sensor may comprise a transparent substrate, and a plurality of electrode patterns formed on the transparent substrate, each of the electrode patterns comprising a plurality of electrode layers.

The electrode layers may comprise a base layer formed on one surface of the transparent substrate and bonding the electrode patterns to the transparent substrate, and a conductive layer, formed on the base layer, having electrical conductivity.

The electrode layers may further comprise a surface layer formed as an uppermost layer of the electrode patterns. The surface layer may be made of a material reducing visibility of the electrode patterns or preventing corrosion of the electrode patterns.

The touch sensor may further comprise an electrode wiring coupled to the electrode patterns and having a plurality of layers corresponding to the electrode layers of the electrode patterns.

BRIEF DESCRIPTION OF THE DRAWINGS

Embodiments of the present invention will be more clearly understood from the following detailed description taken in conjunction with the accompanying drawings, in which.

DESCRIPTION OF THE PREFERRED EMBODIMENTS

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first," "second," "one side," "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the drawings.

Figure 1:
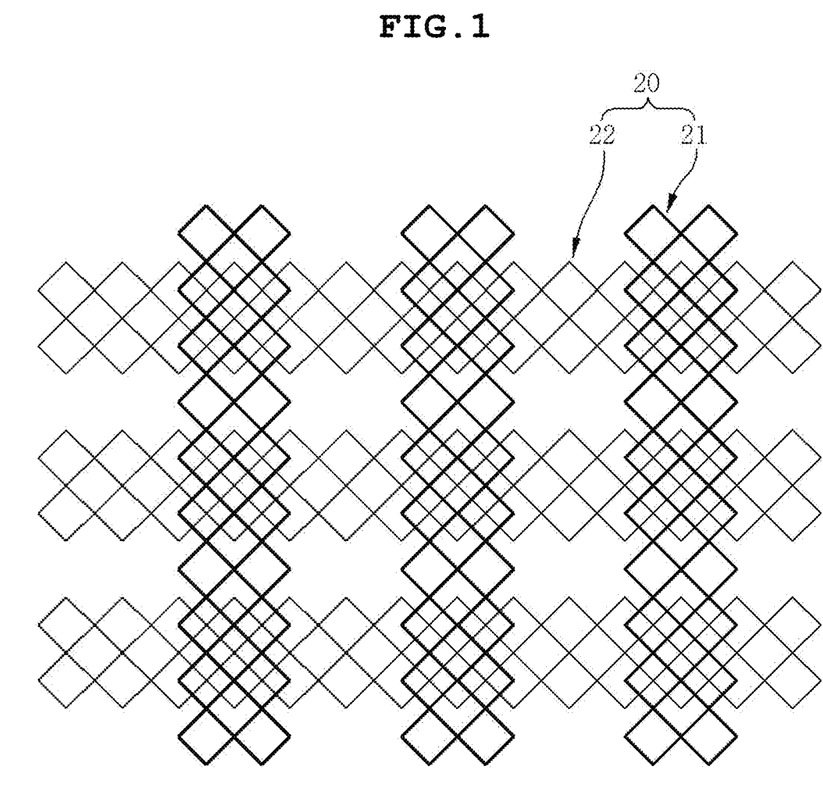
FIG. 1 is a plan view of electrode patterns according to an embodiment of the present invention.
Figure 2:
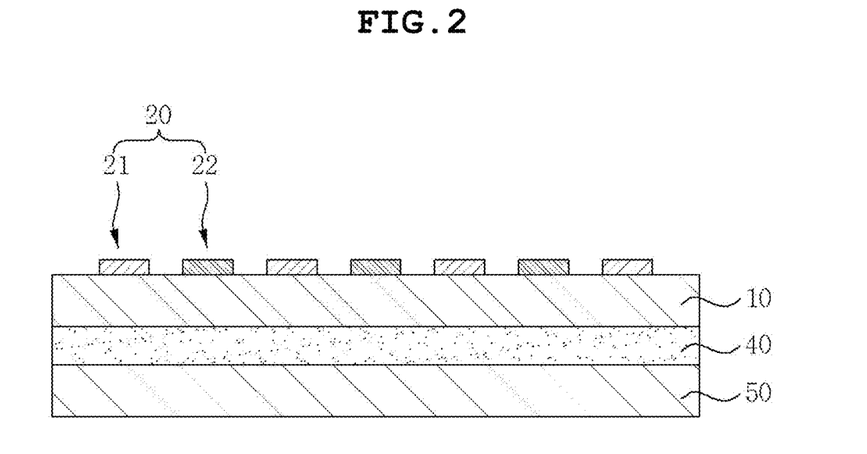
FIG. 2 is a cross-sectional view of a touch sensor according to an embodiment of the present invention.

FIG. 1 is a plan view of electrode patterns 20 according to an embodiment of the present invention. FIG. 2 is a cross-sectional view of a touch sensor according to an embodiment of the present invention.

The touch sensor according to the present embodiment may include a transparent substrate 10 and the electrode patterns 20 formed on the transparent substrate 10. The electrode patterns 20 may be formed by stacking two or more electrode layers 20a.

The touch sensor according to the present embodiment may be configured in such a way that the electrode patterns 20 are formed on a surface and/or an opposite surface of the transparent substrate 10. As illustrated in FIG. 1, the electrode patterns 20 may be formed in a bar & bar type such that a first electrode pattern 21 and a second electrode pattern 22 cross each other. As illustrated in FIG. 1, according to the bar & bar type, each of the electrode patterns 20 that crosses each other may be shaped like a rod and each of the electrode patterns 20 may have a corresponding width (which refers to a shorter width). Thus, the first electrode pattern 21 in the Y-axis direction (one direction) and the second electrode pattern 22 in the X-axis direction (another direction) that crosses the first electrode pattern 21 may be formed to extract touch coordinates on a two-dimensional plan.

FIG. 2 illustrates an exemplary embodiment in which the electrode patterns 20 are formed on only one surface of the transparent substrate 10. As shown in FIG. 2, the first electrode pattern 21 and the second electrode pattern 22 that cross each other may be formed on one same surface of the transparent substrate 10. When the electrode patterns 20 that cross each other in two directions are formed on one plane, insulating patterns (not shown) may be formed at intersections between the electrode patterns 20 to form the first electrode pattern 21 and the second electrode pattern 22 as one layer.

Figure 3:
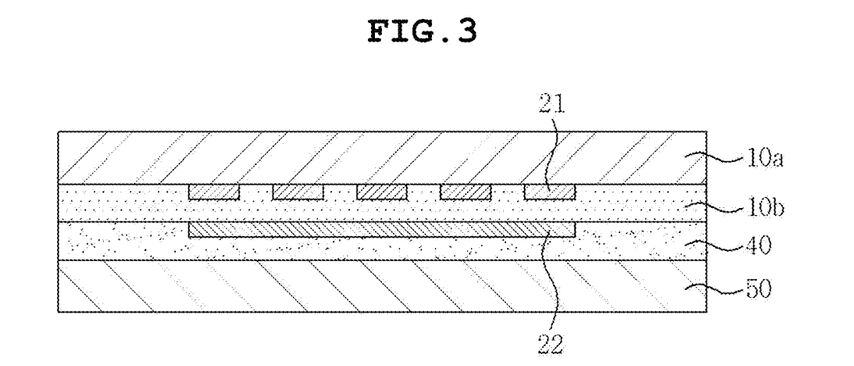
FIG. 3 is a cross-sectional view of a touch sensor according to another embodiment of the present invention.

In addition, as illustrated in FIG. 3, a touch sensor according to another embodiment of the present invention may be configured in such a way that the first electrode pattern 21 is formed directly on a window substrate 10a, a thin film resin layer 10b is coated on the first electrode pattern 21, and then, the second electrode pattern 22 is formed on the resin layer 10b. The electrode patterns 20 formed directly on the window substrate 10a may enhance the sensitivity of the touch sensor. In addition, since a separate transparent substrate 10 may not be needed, the touch sensor may be miniaturized.

Figure 4:
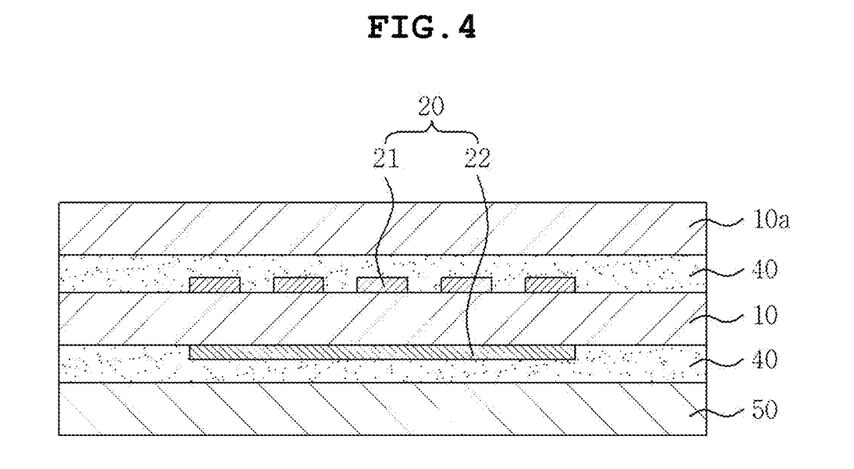
FIG. 4 is a cross-sectional view of a touch sensor according to another embodiment of the present invention.

According to another embodiment of the present invention, as illustrated in FIG. 4, the first electrode pattern 21 in the X-axis direction may be formed on a surface of the transparent substrate 10, and the second electrode pattern 22 in the Y-axis direction that crosses the first electrode pattern 21 may be formed on an opposite surface of the transparent substrate 10. The drawings illustrates the case in which the first electrode pattern 21 and the second electrode pattern 22 cross each other at a right angle. However, embodiments of the present invention are not limited to the crossing angle. That is, in order to extract coordinates on a two-dimensional plane, the first electrode pattern 21 and the second electrode pattern 22 may cross each other at any appropriate angle so as to extract X-axis and Y-axis coordinates.

Figure 5:
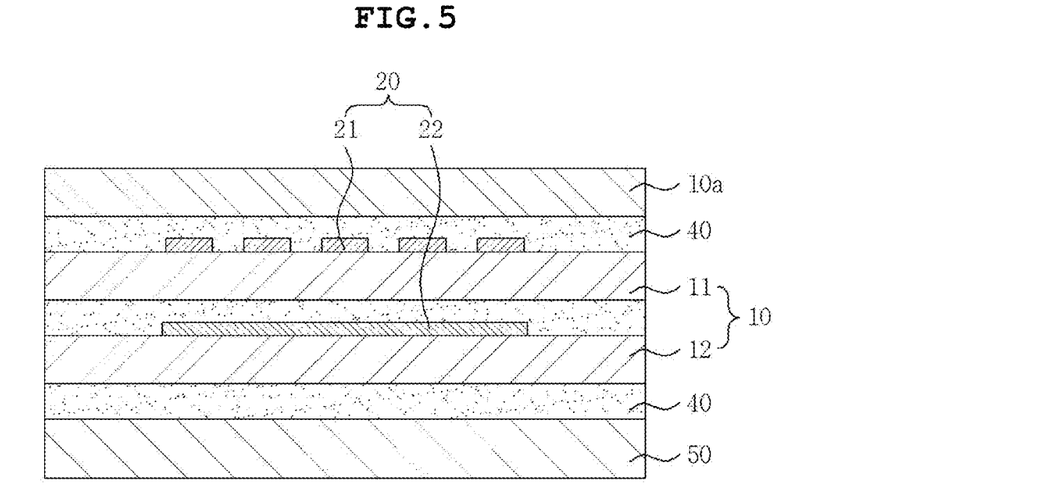
FIG. 5 is a cross-sectional view of a touch sensor according to another embodiment of the present invention.

As illustrated in FIG. 5, a touch sensor according to another embodiment of the present invention may be configured in such a way that a first transparent substrate 11 and a second transparent substrate 12 are formed, and the first electrode pattern 21 is formed on the first transparent substrate 11 and the second electrode pattern 22 that faces the first electrode pattern 21 in a direction so as to cross the first electrode pattern 21 is formed on the second transparent substrate 12. The first transparent substrate 11 and the second transparent substrate 12 may be coupled to each other by an adhesive layer 40 such as transparent adhesives to manufacture the touch sensor. The touch sensor may further include the window substrate 10a formed at an outermost layer, as a protection layer for protection of the electrode patterns 20 of the touch sensor. The window substrate 10a may be formed of tempered glass or the like or may be formed by coating any material that functions as a protection layer.

Here, the first electrode pattern 21 and/or the second electrode pattern 22 may include a first electrode layer 20a-1, a second electrode layer 20a-2, and a third electrode layer 20a-3 that are sequentially formed on one surface or an opposite surface of the transparent substrate 10. The first electrode layer 20a-1, the second electrode layer 20a-2, and the third electrode layer 20a-3 described above may be formed as each of the first electrode pattern 21 and the second electrode pattern 22. A plurality of electrode layers 20a may be selectively formed on portions of any one of the electrode patterns 20, which are exposed to be visible to a user of the touch sensor.

In another embodiment of the present invention, the touch sensor may have different structures of the transparent substrate 10 and the electrode patterns 20. The material and properties of the first electrode layer 20a-1, the second electrode layer 20a-2, and the third electrode layer 20a-3 that are used in the embodiments when the electrode patterns 20 are formed as a stack structure of the electrode layers 20a will be described below in detail.

In addition, a display 50 for displaying an output value in response to input by a user through the touch sensor may be adhered to the opposite surface of the transparent substrate 10. The display 50 may be an imaging device, and may include various display devices such as a liquid crystal display (LCD), an organic light emitting diode (OLED), etc. However, embodiments of the present invention are not limited to a particular type of device.

The transparent substrate 10 of the touch sensor may be formed of any material as long as the material has predetermined strength or more, has transmittance of 85% or more, and outputs an image of the display 50. Although not limited to a particular material, the transparent substrate 10 may be formed of polyethylene terephthalate (PET), polycarbonate (PC), polymethylmethacrylate (PMMA), polyethylenenaphthalate (PEN), polyehtersulfone (PES), cyclic olefin polymer (COP), triacetylcellulose (TAC) film, polyvinyl alcohol (PVA) film, polyimide (PI) film, polystyrene (PS), K-resin containing biaxially oriented PS (BOPS), glass, tempered glass, or the like. Since the electrode patterns 20 is formed on one surface of the transparent substrate 10, high frequency processing, primer processing, or the like may be performed on one surface of the transparent substrate 10 to form a surface processing layer in order to enhance the adhesion between the transparent substrate 10 and the electrode patterns 20.

The electrode patterns 20 may be formed on one surface of the transparent substrate 10. As described above, the touch sensor according to an embodiment of the present invention may be configured in such a way that the first electrode pattern 21 and the second electrode pattern 22 that cross each other are formed on one same surface of the transparent substrate 10. Here, the electrode patterns 20 may be formed with mesh patterns formed by metal wires. The mesh patterns may be shaped like a polygon such as a quadrangle, a triangle, a diamond, or the like, but are not limited to a particular shape. The electrode patterns 20 formed with mesh patterns may be formed of at least one selected from the group consisting of copper (Cu), aluminium (Al), gold (Au), silver (Ag), titanium (Ti), palladium (Pd), chrome (Cr), nickel (Ni), or an alloy thereof.

The electrode patterns 20 may be formed using a dry process, a wet process, or a direct patterning process. Here, the dry process may be performed by sputtering, evaporation, etc. The wet process may be performed by dip coating, spin coating, roll coating, spray coating, etc. The direct patterning process may be performed by screen printing, gravure printing, inkjet printing, etc.

For example, using photolithography, a photosensitive material may be coated on the electrode patterns 20 on a substrate and be irradiated with light using a mask having a desired pattern. In this case, a developing process for removing exposed or non-exposed portions of the photosensitive material with a developer may be performed in order to form desired patterns. Then, the photosensitive material may be formed with predetermined patterns, the remaining portions may be removed by etching solution using the photosensitive material as resist, and then the photosensitive material may be removed to form the electrode patterns 20 with desired patterns.

In addition, a lift-off method may be used to form the electrode patterns 20 with a fine line width using various electrode materials.

The lift-off method may be simpler than a process such as evaporation or photolithography, does not require preparation of a separate mask, and may not use expensive exposure equipment. A case in which the lift-off method is used to form insulating patterns 30 or the electrode patterns 20 of a touch panel according to an embodiment of the present invention will be described briefly.

First, when fine patterns are formed via a printing scheme, etc., a bank (not shown) as a partition member may be formed on a substrate in order to enhance the accuracy of pattern line width. The bank may be formed to separate an area except for desired patterns from a predetermined region on the transparent substrate 10. The bank may be formed of photo acryl, polyimide, polyvinylalcohol, polyvinyl chloride, polyacryl amide, polyethylene glycol, or the like. These materials may prevent materials of the insulating patterns 30 or the electrode patterns 20 from being dissolved or damaged. Appropriate materials may be used and applied by one having ordinary skill in the art according to the material of the electrode patterns 20.

Then, a metallic material used in the electrode patterns 20 may be coated on the substrate on which the bank is formed. Various methods such as screen printing, offset printing, spin coating, etc. may be selectively applied.

Lastly, the electrode patterns 20 may be formed via a lift-off operation. In the operation, an operation for lifting off portions of the bank, on which the electrode patterns 20 are formed, may be performed to form desired electrode patterns 20. Here, an example of the lift-off method may include an operation for removing the bank using a solution for dissolving materials included in the bank. In this operation, portions of the electrode patterns 20, formed on the bank, may be simultaneously removed. Thus, only portions of the electrode patterns 20, which do not include the bank, may remain to achieve the desired electrode patterns 20.

As the electrode patterns 20 are formed with the mesh pattern using opaque metal wire, the electrode patterns 20 of the touch sensor are easily visible to a user. Thus, the electrode patterns 20 may be formed with fine patterns. The visibility of the electrode patterns 20 including mesh patterns needs to be reduced. In addition, since the electrode patterns 20 are formed using metal wire, problems may arise in terms of a potential difference or durability in that the electrode patterns 20 may be corroded as the electrode patterns 20 are connected to electrode wire for connection between an anode and a cathode.

Accordingly, some embodiments of the present invention may provide a touch sensor that is configured in such a way that the plural electrode layers 20a for more effective combination of materials of the electrode patterns 20 are formed and separate metals for preventing the electrode patterns 20 from being corroded are alloyed, thereby more effectively enhancing the environmental reliability and visibility of the electrode patterns 20 as well as achieving the conductivity of the electrode patterns 20.

The electrode patterns 20 according to an embodiment of the present invention may be configured in such way that at least two or more electrode layers 20a are formed in a stack direction on the transparent substrate 10 in order to enhance the environmental reliability and visibility of the electrode patterns 20.

Figure 6:
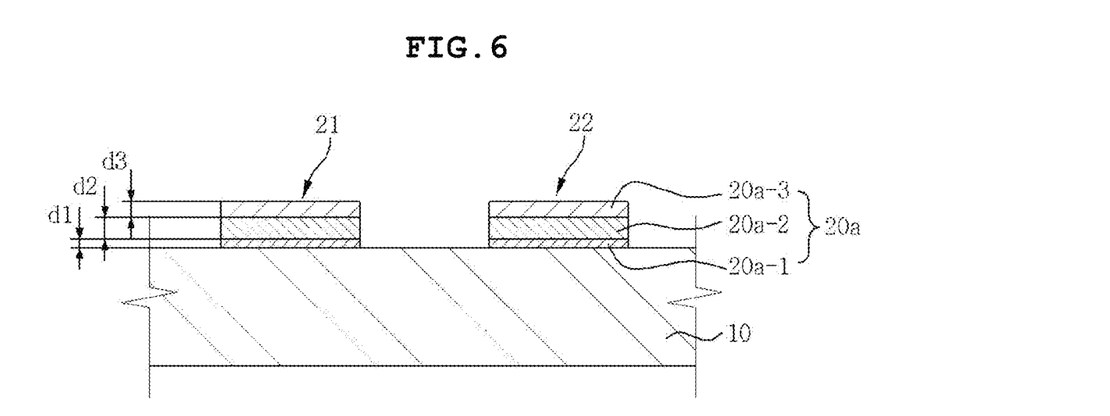
FIGS. 6 to 8 are partial enlarged cross-sectional views of electrode patterns formed as a plurality of electrode layers according to an embodiment of the present invention.
Figure 7:
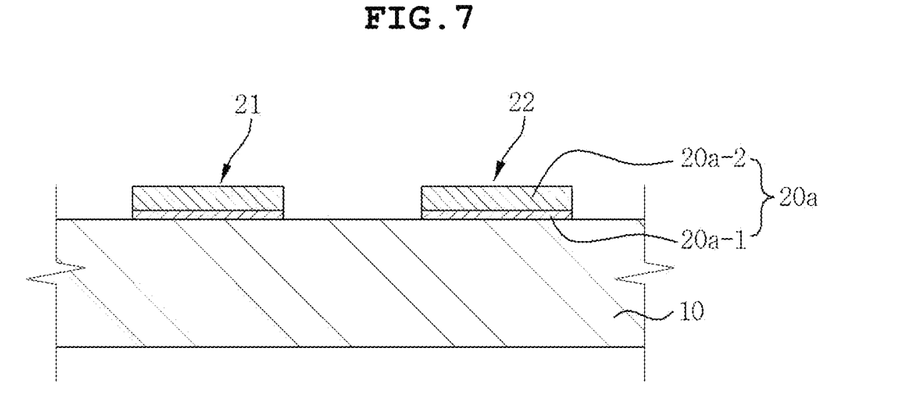
Figure 8:
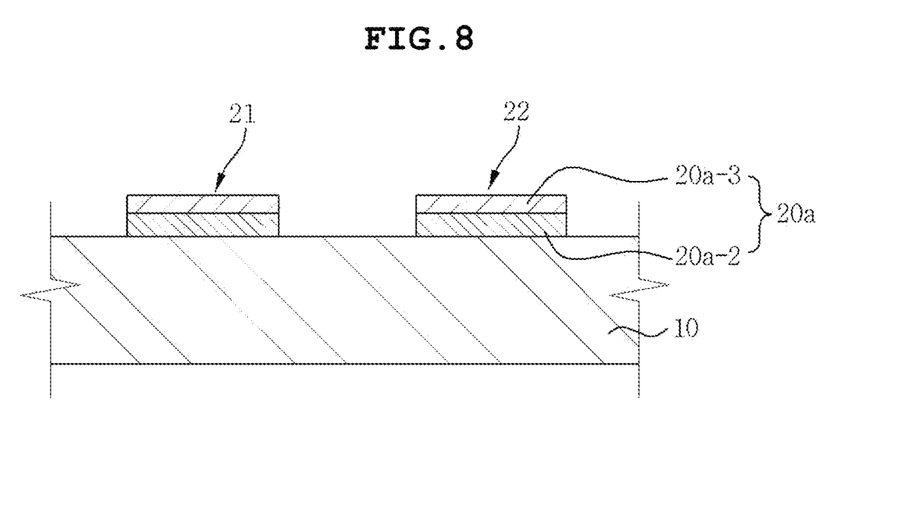

As illustrated in FIGS. 6 to 8, the electrode patterns 20 may be formed in such a way that a base layer 20a-1, a conductive layer 20a-2, and a surface layer 20a-3 are sequentially formed from one surface of the transparent substrate 10 (refer to FIG. 6), or the base layer 20a-1 and the conductive layer 20a-2 are formed (refer to FIG. 7), or the conductive layer 20a-2 and the surface layer 20a-3 are formed (refer to FIG. 8). A number of these stacked layers is not particularly limited, and may be modified by one having ordinary skill in the art in order to enhance the same or corresponding related effect. However, for convenience of description, a detailed description will be given in which a base layer is referred to the first electrode layer 20a-1, a conductive layer is referred to the second electrode layer 20a-2, and a surface layer is referred to the third electrode layer 20a-3. In addition, the scope of these elements is not limited by their names and functions thereof.

The first electrode layer 20a-1 adhered to one surface of the transparent substrate 10 may, for example, ensure the adhesion with the transparent substrate 10 and improve a etching rate in an etching process to be performed for formation of the electrode patterns 20 to easily embody fine electrode patterns 20. The third electrode layer 20a-3 may employ, for instance, an anti-corrosion material for preventing reduction in electrical reliability due to corrosion of the electrode patterns 20 or may be formed of a material for improving visibility to a user at an outermost layer.

TABLE 1

| | Electrode Material | | | | | |
|---|---|---|---|---|---|---|
| Series No. | Base layer (first electrode layer) | Composition (wt %) | Conductive layer (second electrode layer) | Composition (wt %) | Surface layer (third electrode layer) | Composition (wt %) |
| Example 1 | CuNi | Ni (10 to 90) Ni (20 to 70) | Cu | 98 to 100 | CuNi | Ni (10 to 90) Ni (20 to 70) |
| Example 2 | NiCr | Cr (5 to 70) Cr (3 to 50) | Cu | 98 to 100 | NiCr | Cr (5 to 70) Cr (3 to 50) |
| Example 3 | Ti | | Cu | 98 to 100 | Ti | |
| Example 4 | Mo | | Cu | 98 to 100 | Mo | |

TABLE 1-continued

| | Electrode Material | | | | | |
|---|---|---|---|---|---|---|
| Series No. | Base layer (first electrode layer) | Composition (wt %) | Conductive layer (second electrode layer) | Composition (wt %) | Surface layer (third electrode layer) | Composition (wt %) |
| Example 5 | CuNi | Ni (10 to 90) | Al | 98 to 100 | CuNi | Ni (10 to 90) |
| | | Ni (20 to 70) | | | | Ni (20 to 70) |
| Example 6 | NiCr | Cr (5 to 70) | Al | 98 to 100 | NiCr | Cr (5 to 70) |
| | | Cr (3 to 50) | | | | Cr (3 to 50) |
| Example 7 | Ti | | Al | 98 to 100 | Ti | |
| Example 8 | Mo | | Al | 98 to 100 | Mo | |
| Example 9 | CuNi | Ni (10 to 90) | Ag | 80 to 97 | CuNi | Ni (10 to 90) |
| | | Ni (20 to 70) | | | | Ni (20 to 70) |
| Example 10 | NiCr | Cr (5 to 70) | Ag | 80 to 97 | NiCr | Cr (5 to 70) |
| | | Cr (3 to 50) | | | | Cr (3 to 50) |
| Example 11 | Ti | | Ag | 80 to 97 | Ti | |
| Example 12 | Mo | | Ag | 80 to 97 | Mo | |

According to embodiments of the present invention, the materials of Example 1 to Example 12 shown in Table 1 above as materials of the first electrode layer 20a-1 and the second electrode layer 20a-2 or the first electrode layer 20a-1, the second electrode layer 20a-2, and the third electrode layer 20a-3 may be appropriately combined and applied.

For example, with regard to each electrode layer according to embodiments of the present invention, basically, the first electrode layer 20a-1 as a base layer may selectively use an alloy including Cu and Ni, an alloy including Ni or Cr, or an alloy including Ti or Mo. The second electrode layer 20a-2 may selectively use Cu, Al, or Ag. The third electrode layer 20a-3 may selectively use an alloy including Cu or Ni, an alloy including Ni or Cr, or Ti or Mo. Although materials are described in terms of each example, materials of the first electrode layer 20a-1, the second electrode layer 20a-2, and the third electrode layer 20a-3 may be independent. The materials of the first electrode layer 20a-1, the second electrode layer 20a-2, and the third electrode layer 20a-3 may be selected and two or three electrode layers may be combined and formed, and embodiments of the present invention are not limited to the proposed combination of the first electrode layer 20a-1, the second electrode layer 20a-2, and the third electrode layer 20a-3, proposed in each example.

For example, the first electrode layer 20a-1 and the third electrode layer 20a-3 may be formed of an alloy including Cu and Ni. Ni may be used in order to reduce the visibility of Cu, and Cu may be used for good electric conductivity. Conventionally, when a blackening process for reduction in the visibility of the electrode patterns 20 formed of Cu is performed, there is a limit in maintaining the thickness of the electrode patterns 20 to a predetermined thickness or more in order to ensure a minimum area of an upper sectional surface of the blackened electrode patterns 20. However, the third electrode layer 20a-3 formed of an alloy including Ni may be stacked on exposed portions of the electrode patterns 20 so as to reduce the visibility of the electrode patterns 20 without limitation in the thickness of the electrode patterns 20. The amount of Ni included in the first electrode layer 20a-1 or the third electrode layer 20a-3 may be 10 wt % to 90 wt %, more appropriately, 20 wt % to 70 wt %.

The first electrode layer 20a-1 and/or the third electrode layer 20a-3 may be formed of an alloy including Ni or Cr. In this case, the amount of Cr may be 5 wt % to 70 wt %, more appropriately, 3 wt % to 50 wt %.

The first electrode layer 20a-1 and/or the third electrode layer 20a-3 may be formed of an alloy including Ti or Mo The third electrode layer 20a-3 may further include manganese (Mn), iron (Fe), or silicon (Si) for enhancing the anti-corrosion of the electrode patterns 20. A minimum range of Mn, Fe, or Si may be used and the amount of Mn, Fe, or Si may be 0.1 wt % to 1 wt %.

The second electrode layer 20a-2 may be formed of Cu, Al, or an alloy thereof and may be selected and applied in consideration of electrical conductivity. In addition, the amount of Cu or Al may be 98 wt % to 100 wt % in consideration of electrical conductivity, and the amount of Ag may be 80 wt % to 97 wt %.

The second electrode layer 20a-2 may be formed of an alloy including Cu and Ni, and Cu and Ni may be alloyed such that the amount of Ni may be 0.1 wt % to 5 wt % in consideration of electrical conductivity. The second electrode layer 20a-2 may be formed of any metal with electrical conductivity, but not limited to. Materials of the second electrode layer 20a-2 may be selected and applied in consideration of the adhesion between the electrode layers 20a and the chemical properties due to contact between the electrode layers 20a for combination with the first electrode layer 20a-1 and the third electrode layer 20a-3.

Then, the electrode patterns 20 may be formed as three layers including the aforementioned first electrode layer 20a-1, second electrode layer 20a-2, and third electrode layer 20a-3. However, as illustrated in FIGS. 7 and 8, the electrode patterns 20 may be formed as two electrode layers 20a including the first electrode layer 20a-1 and the second electrode layer 20a-2 or the second electrode layer 20a-2 and the third electrode layer 20a-3. In addition, a stack structure of the electrode layers 20a of the electrode patterns 20 is not limited to two or three electrode layers 20a as long as the stack structure satisfies the material properties due to the anti-corrosion and visibility of the first electrode layer 20a-1 at a contact surface between the transparent substrate 10 and the electrode patterns 20, and the third electrode layer 20a-3 formed at an outermost layer. However, along with trend of thinned touch sensors, the stack structure and stack number may be variously implemented in consideration of the thickness of the electrode patterns 20.

With reference to FIG. 6, stack-direction thicknesses of the first electrode layer 20a-1, the second electrode layer 20a-2, and the third electrode layer 20a-3, for forming electrode patterns 20 of a touch sensor, will be described below.

The first electrode layer 20a-1 may be formed on the contact surface between the transparent substrate 10 and the electrode patterns 20 and may be formed as a thin film layer in order to enhance the adhesion between the transparent substrate 10 and the electrode patterns 20. The third electrode layer 20a-3 may be formed in order to achieve anti-corrosion and reduce the visibility of the electrode patterns 20, and the first electrode layer 20a-1 may be formed to a relatively wide stack-direction thickness.

For example, when the first electrode layer 20a-1 and the second electrode layer 20a-2 are formed to be sequentially stacked on one surface of the transparent substrate 10, the first electrode layer 20a-1 may be formed to be thinner than a stack-direction thickness of the second electrode layer 20a-2. Through the relative thickness difference, a base layer may enhance the adhesion between the transparent substrate 10 and the electrode patterns 20 through the first electrode layer 20a-1, thereby improving the reliability of the electrode patterns 20.

When the third electrode layer 20a-3 is further formed on the second electrode layer 20a-2, a stack-direction thickness of the third electrode layer 20a-3 may be smaller than that of the second electrode layer 20a-2, and/or a stack-direction thickness of the third electrode layer 20a-3 may be smaller than that of the first electrode layer 20a-1.

For instance, a minimum thickness of the first electrode layer 20a-1 as a base layer on a transparent substrate 10 for maintaining the adhesion of the second electrode layer 20a-2 may be 0.01 µm. A minimum thickness of the second electrode layer 20a-2 as a conductive layer for maintaining the electrical conductivity of the electrode patterns 20 may be 0.04 µm. A minimum thickness of the third electrode layer 20a-3 as a surface layer for maintaining the visibility of the electrode patterns 20 and preventing corrosion may be 0.015 µm.

Thus, the sum of thicknesses of the first electrode layer 20a-1, the second electrode layer 20a-2, and the third electrode layer 20a-3 may be 0.05 µm to 2 µm.

According to the above relationship, the first electrode layer 20a-1 may be formed with a thickness of 0.01 µm to 1.945 µm to be thinned the electrode patterns 20 and ensure the adhesive reliability of a conductive layer as the second electrode layer 20a-2 on the transparent substrate 10. When the thickness of the first electrode layer 20a-1 is below a minimum range, adhesion may be weak and thus the adhesive reliability of the second electrode layer 20a-2 as the conductive layer may not be ensured. For example, when the first electrode layer 20a-1 is formed with a thickness greater than 1.935 µm, it may be difficult to thin the electrode patterns 20 and the adhesion with the second electrode layer 20a-2 as a conductive layer may be rather degraded, and thus, the first electrode layer 20a-1 may not perform a natural function thereof.

The second electrode layer 20a-2 may be formed with a thickness of 0.04 µm to 1.975 µm to function as a conductive layer, thereby achieving the electrical reliability and operational performance by electrode patterns of a touch sensor. For instance, when the thickness of the second electrode layer 20a-2 is less than 0.04 µm, the second electrode layer 20a-2 may not function as a conductive layer, and thus, electrical reliability may not be ensured. When the second electrode layer 20a-2 has a thickness greater than 1.975 µm, adhesion by the first electrode layer 20a-1 as a base layer may not be ensured.

The third electrode layer 20a-3 may be formed to a thickness of 0.015 µm to 1.95 µm to function as a surface layer, thereby reducing the visibility of the electrode patterns 20 and preventing corrosion of portions of the electrode patterns, which are exposed outwards. When the thickness of the third electrode layer 20a-3 is less than 0.015 µm, the third electrode layer 20a-3 may not function as a surface layer and thus may not effectively reduce the visibility of the second electrode layer 20a-2 as a conductive layer. When the third electrode layer 20a-3 is formed to a thickness greater than 1.95 µm, it may be difficult to thin the electrode patterns and the electrical reliability of entire electrode patterns may be degraded due to an excessive thickness of a surface layer.

Thus, the first electrode layer 20a-1 and the second electrode layer 20a-2 or the first electrode layer 20a-1, the second electrode layer 20a-2, and the third electrode layer 20a-3 may have relative thickness differences and are designed with respective thicknesses described above in predetermined ranges, thereby reducing visibility due to use of opaque electrode patterns and preventing exposed portions of the electrode patterns 20 from being corroded as well as achieving the operational reliability of a touch sensor.

With regard to thicknesses d1, d2, and d3 of the first electrode layer 20a-1, the second electrode layer 20a-2, and the third electrode layer 20a-3 formed in the stack direction, the thickness d1 of the first electrode layer 20a-1 may be smaller than the thickness d3 of the third electrode layer 20a-3, and the thickness d3 of the third electrode layer 20a-3 may be smaller than the thickness d2 of the second electrode layer 20a-2.

Here, the properties and materials of the first electrode layer 20a-1, the second electrode layer 20a-2, and the third electrode layer 20a-3 may be the same as those of the three aforementioned electrode layers 20a, and thus, a detailed description thereof is not be repeated herein.

Figure 9:
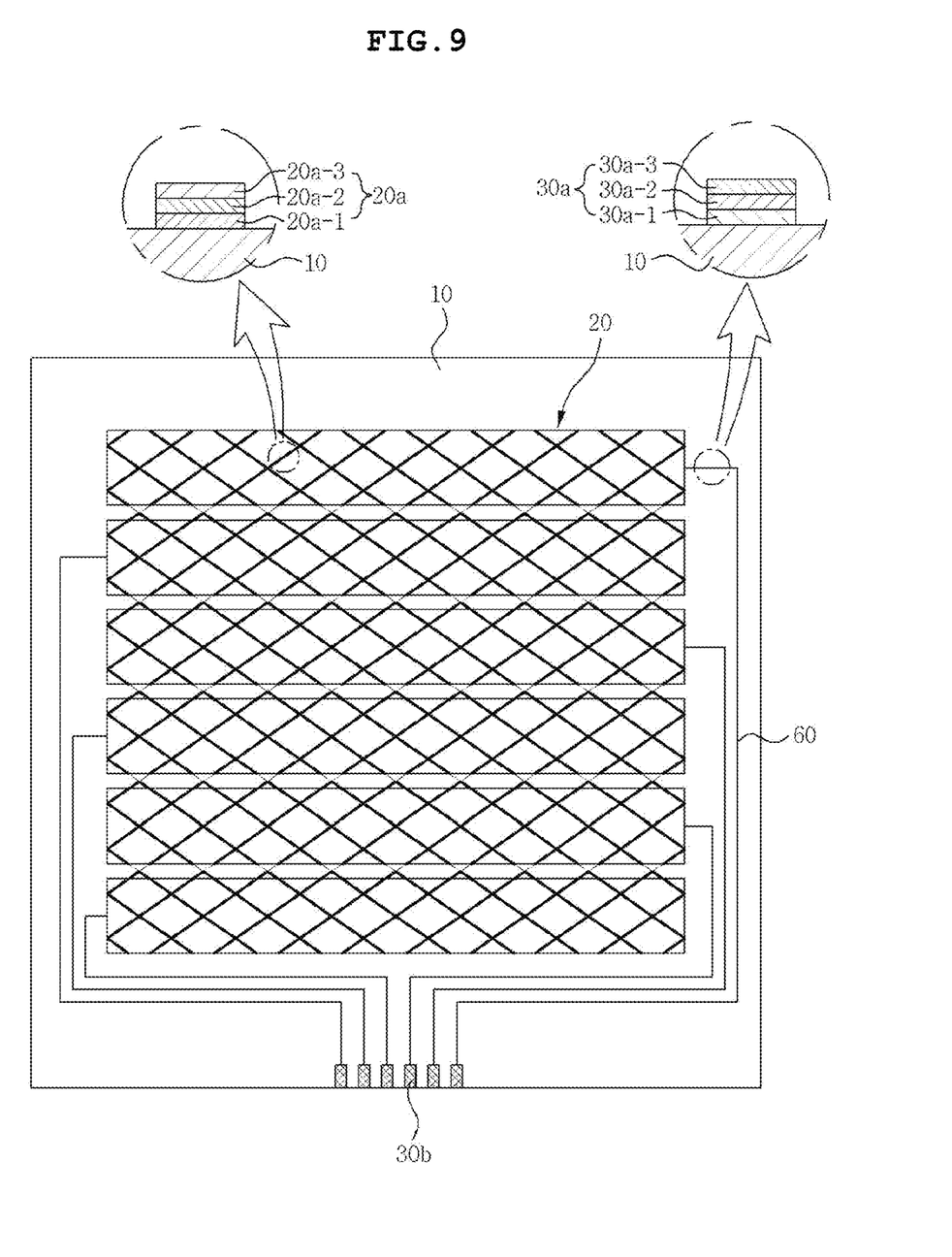
FIG. 9 is a diagram illustrating the structure of electrode wirings of a touch sensor according to an embodiment of the present invention.

FIG. 9 is a diagram illustrating electrode wirings 60 of a touch sensor according to an embodiment of the present invention.

As illustrated in FIG. 9, the electrode wirings 60 of the touch sensor according to the present embodiment may be connected to the electrode patterns 20 for electrical connection of the electrode patterns 20. The electrode wirings 60 may include a plurality of electrode wiring layers 30a corresponding to the electrode layers 20a included in the electrode patterns 20. That is, during manufacture of the touch sensor, the electrode wirings 30 may be manufactured using the same manufacturing process as that of the electrode patterns 20 so as to form the electrode wiring layers 30a corresponding to the same materials as that of the electrode layers 20a of the electrode patterns 20. However, the manufacturing process or materials of the electrode wiring layers 30a are not particularly limited. The plural electrode wiring layers 30a for preventing corrosion of the electrode wirings 60 or for the environmental reliability of the electrode wirings 60 may be stacked and may be separately formed.

As illustrated in FIG. 9, the electrode wirings 60 may be formed by stacking a first electrode wiring layer 30a-1, a second electrode wiring layer 30a-2, and a third electrode wiring layer 30a-3. The electrode wiring layers 30a may correspond to the electrode layers 20a of the aforementioned touch sensor. Thus, it is obvious that the electrode wirings 30 may be formed as the electrode wiring layers 30a with various stack structures with two layers or more.

In addition, contact pads 30b for electrical connection with a flexible printed circuit board (not shown) may be formed with a mesh form at one end of the electrode wirings 60. In this case, the contact pads 30b may be stacked and manufactured in the same way as the aforementioned electrode wiring layers 30a of the electrode wirings 60.

According to some embodiments of the present invention, electrode patterns 20 may be formed as at least two or more electrode layers, for example, thereby enhancing the anti-corrosion and visibility of electrode patterns.

Through a multi-layered structure of electrode patterns 20 of a touch sensor, an electrode layer of electrode patterns 20, that contacts a transparent substrate, may be formed as a thin film layer, for instance, thereby improving the adhesion with the transparent substrate 10.

An upper electrode layer of electrode patterns 20, which is exposed at an outermost layer and is visible to a user, may be formed as an alloy layer including Ni, for example, thereby reducing the visibility of the electrode patterns to the user.

An alloy including Mn, Fe, and Si may be formed on exposed portions of the electrode patterns 20 in order to enhance the anti-corrosion of the electrode patterns 20 of the touch sensor, for instance, thereby more effectively enhancing the reliability with respect to anti-corrosion.

A portion of an electrode layer, which contacts a transparent substrate of electrode patterns of a touch sensor may be formed as a thin film type alloy layer including Ni to increase an etching rate during an etching process performed to form electrode patterns, thereby achieving fine patterns.

In addition, a portion of an electrode layer, which contacts a transparent substrate 10, is formed as a thin film type alloy layer to increase the adhesion of the electrode patterns 20, thereby easily ensuring the operational performance and driving reliability of a touch sensor.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A touch sensor comprising:
a transparent substrate; and
an electrode pattern formed on the transparent substrate, wherein the electrode pattern is formed by stacking two or more electrode layers,
and at least one of the two or more electrode layers enhances either one or both of anticorrosion of an exposed portion of the electrode pattern and adhesion between the electrode pattern and the transparent substrate.

2. The touch sensor as set forth in claim 1, wherein the electrode pattern is formed by sequentially stacking, from one surface of the transparent substrate, a base layer as a first electrode layer and a conductive layer as a second electrode layer.

3. The touch sensor as set forth in claim 2, wherein the electrode pattern is formed by further stacking a surface layer as a third electrode layer on the second electrode layer.

4. The touch sensor as set forth in claim 3, wherein a stack-direction thickness d1 of the first electrode layer, a stack-direction thickness d2 of the second electrode layer, and a stack-direction thickness d3 of the third electrode layer satisfy a following conditional expression: $d1<d3<d2$.

5. The touch sensor as set forth in claim 3, wherein the sum of a stack direction thickness d1 of the first electrode layer, a stack-direction thickness d2 of the second electrode layer, and a stack-direction thickness d3 of the third electrode layer is 0.05 μm to 2 μm.

6. The touch sensor as set forth in claim 3, wherein a stack-direction thickness of the first electrode layer is 0.01 μm to 1.935 μm.

7. The touch sensor as set forth in claim 3, wherein a stack-direction thickness of the second electrode layer is 0.04 μm to 1.975 μm.

8. The touch sensor as set forth in claim 3, wherein a stack-direction thickness of the third electrode layer is 0.015 μm to 1.95 μm.

9. The touch sensor as set forth in claim 3, wherein a stack-direction thickness d1 of the first electrode layer, a stack-direction thickness d2 of the second electrode layer, and a stack-direction thickness d3 of the third electrode layer satisfy a following conditional expression: $2\% \leq d2/(d1+d2+d3) \times 100 \leq 98.75\%$.

10. The touch sensor as set forth in claim 2, wherein the first electrode layer is formed to have a smaller thickness in the stack direction than that of the second electrode layer.

11. The touch sensor as set forth in claim 1, wherein the transparent substrate is formed of glass or temperate glass.

12. The touch sensor set forth in claim 1, further comprising: a second electrode pattern disposed apart from the first electrode pattern and formed by
stacking two or more electrode layers.

13. The touch sensor set forth in claim 12, wherein the second electrode pattern is disposed on the transparent substrate.

14. A touch sensor comprising:
a transparent substrate;
a first electrode pattern disposed on the transparent substrate; and
a second electrode pattern insulated from the first electrode pattern,
wherein the first electrode pattern comprises a first layer, a second layer, and a third layer,
wherein the second layer has a higher electrical conductivity than the first and third layers, the third layer comprises a material that reduces the visibility of the first electrode pattern and prevents corrosion of the first electrode pattern, and the first layer comprises a material that has greater adhesion to the transparent substrate than the second layer.

15. The touch sensor set forth in claim 14, wherein the third layer comprises the same material as the first layer.

16. The touch sensor set forth in claim 15, wherein a stack direction thickness d1 of the first layer, a stack-direction thickness d2 of the second layer, and a stack-direction thickness d3 of the third layer satisfy a following conditional expression: $d1<d3<d2$.

* * * * *